C. A. HAGADONE.
HARVESTER.
APPLICATION FILED DEC. 19, 1913.
1,188,445.
Patented June 27, 1916.
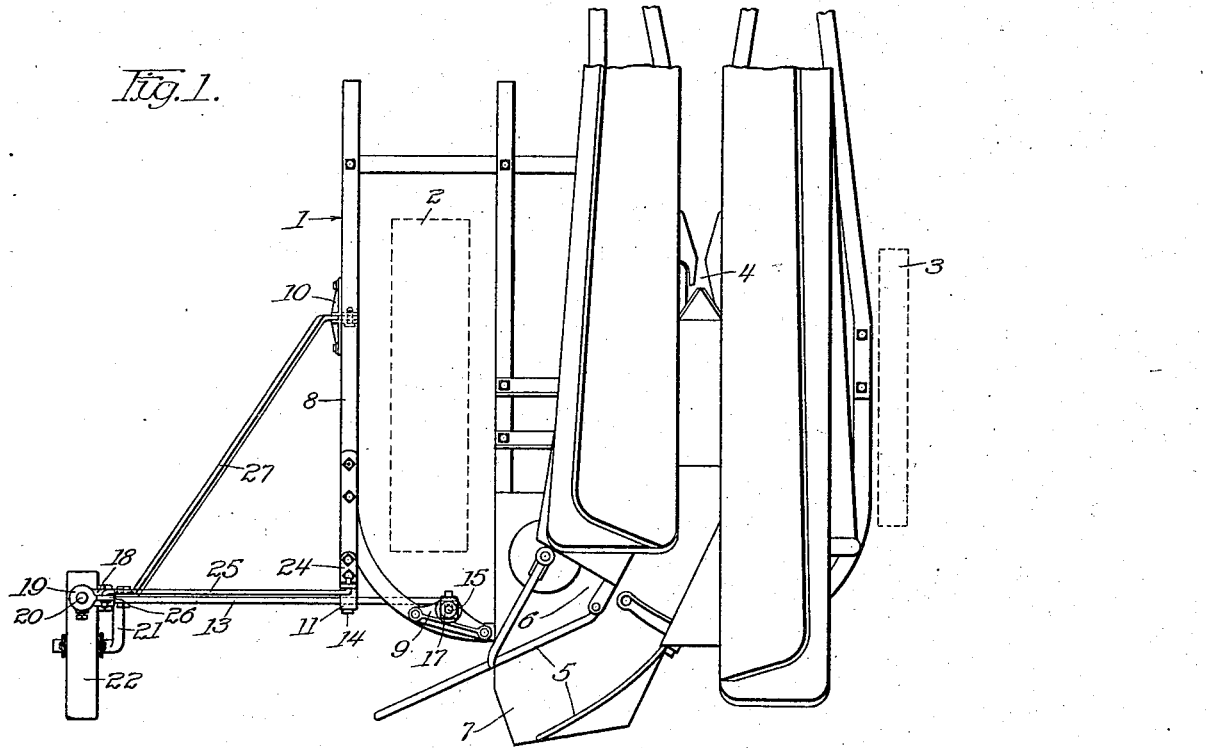
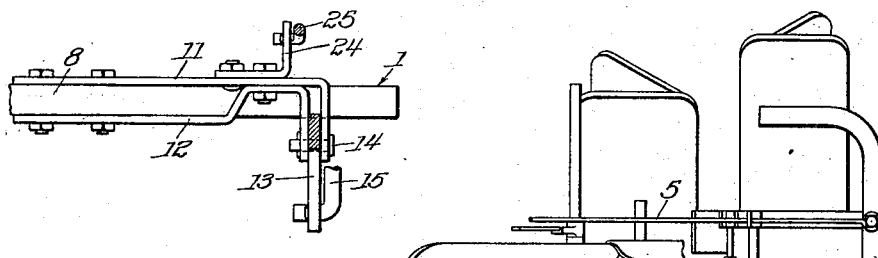
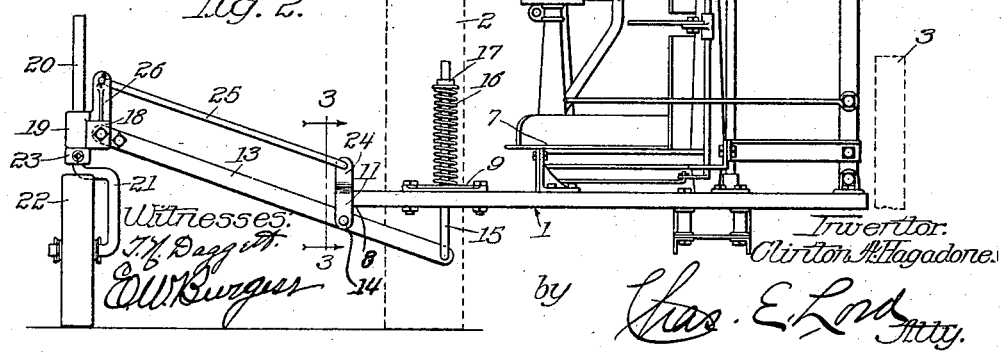

UNITED STATES PATENT OFFICE.

CLINTON A. HAGADONE, OF WESTERN SPRINGS, ILLINOIS, ASSIGNOR TO INTERNATIONAL HARVESTER COMPANY OF NEW JERSEY, A CORPORATION OF NEW JERSEY.

HARVESTER.

1,188,445.      Specification of Letters Patent.      Patented June 27, 1916.

Application filed December 19, 1913. Serial No. 807,604.

*To all whom it may concern:*

Be it known that I, CLINTON A. HAGADONE, a citizen of the United States, residing at Western Springs, in the county of Cook and State of Illinois, have invented certain new and useful Improvements in Harvesters, of which the following is a full, clear, and exact specification.

My invention relates to harvesters in general, and includes a supplemental supporting wheel carried by a frame that is pivotally connected with the wheel frame of a harvester upon the stubbleward side thereof and in an improved manner yieldingly resists a tipping movement of the harvester when operating on a hillside or carrying a grain elevating attachment, being designed in particular for use in connection with a corn harvester that may carry an elevator for delivering bound bundles to a wagon drawn at the side of the machine.

The object of my invention is to provide an improved auxiliary support for a harvester, especially adapted to corn harvesters, which is flexibly connected with the wheel frame of the machine and free to follow uneven ground conditions and to turn freely at the corners of the field. This object is attained by means of various forms of mechanism, one of which is shown for purposes of illustration in the accompanying drawing, in which—

Figure 1 is a top plan view of part of a corn harvester having my invention embodied in its construction; Fig. 2 is a rear end elevation of Fig. 1; and Fig. 3 is a cross sectional detail of part of Fig. 2 along line 3—3, and on an enlarged scale.

Referring to the drawings, wherein like reference numerals designate the same parts throughout the several views, 1 represents the wheel frame of the machine carried by a traction wheel 2 and a grain wheel 3, 4 the cutting apparatus, 5 the stalk guiding prongs, 6 the vertically arranged binder at the rear of the machine, and 7 the butts chute; all of the foregoing parts being common in this type of machine.

The wheel frame 1 of the machine includes a longitudinally arranged frame member 8 upon its stubbleward side, outside of the traction wheel 2 and curved grainward in rear thereof.

9 represents a bracket member secured to the curved portion of the frame member 8, and 10 a bracket member secured to said frame member in front of the axis of the traction wheel. Secured to the rear end of frame member 8, and upon the upper and lower sides, respectively, are bars 11 and 12 that are turned downward at their rear ends and spaced apart to receive between them a transversely disposed bar 13, that is pivotally connected therewith by means of the pin 14, the inner end of the bar being pivotally connected with the lower end of a vertically disposed rod 15 that is slidably received by the bracket member 9 and carries a compression spring 16 operative between an adjusting nut 17 and the bracket 9 to resist a downward pull upon the rod.

18 represents a bracket member pivotally connected with the opposite end of the bar 13, having a vertically arranged sleeve member 19 in which is journaled the stem 20 of the caster wheel supporting yoke 21, upon which is journaled a caster wheel 22, and 23 represents a collar adjustable upon the stem 20 whereby the distance between the tread of the wheel upon the ground and the bracket member 18 may be varied.

24 represents a vertically arranged clip member secured to the rear ends of the bars 11 and 12 and having an opening at its upper end that pivotally receives the inner end of a controlling or equalizing rod 25, the opposite end of which is pivotally connected with a vertically arranged arm 26 integral with the bracket member 18. This rod 25 is disposed parallel with the bar 13 and operates to maintain the caster wheel 22 in a vertical plane as the bar 13 turns about the axis of the pin 14.

27 represents a diagonally disposed bar having its rear end secured to the bar 13 adjacent the bracket member 18, and its opposite end pivotally connected with the bracket member 10 coincident with the axis of the pin 14. In operation the caster wheel supporting members 13 and 27 may rock about their pivotal connections with the frame of the machine and be controlled by the force of the spring 16, said force being regulated by means of the adjusting nut 17.

Having shown and described a preferred form of my invention, I do not wish that it be limited to the precise details of construction shown, as it is understood that changes may be made in the structure without deparing from the spirit of my invention.

What I claim as my invention and desire to secure by Letters Patent is:

1. A harvester including, in combination, a wheel frame, a caster wheel supporting frame having one side pivotally connected with said wheel frame, a bracket member pivotally mounted upon the opposite side of said supporting frame, a caster wheel carrying yoke journaled vertically in said bracket and means for maintaining said yoke and bracket in a vertical position when the supporting frame turns about its axis.

2. A harvester including, in combination, a wheel frame, a caster wheel supporting frame having one side pivotally connected with said wheel frame and yieldingly held against an upward swinging movement, a bracket member pivotally mounted on the opposite side of said supporting frame, a caster wheel carrying yoke journaled vertically in said bracket, and means operative to maintain said yoke and bracket in a vertical position when the supporting frame turns about its axis.

3. A harvester including, in combination, a wheel frame including a longitudinally disposed side frame member at the stubbleward side thereof, a transversely disposed caster wheel supporting bar pivoted intermediate its ends on said side frame member, caster wheel mechanism operatively connected with the outside end of said bar, a spring operatively connected between its opposite end and said wheel frame operative to resist a rocking movement of said bar, and an equalizing rod pivotally connected between said wheeled frame and said caster wheel mechanism to control the position of the latter.

4. A harvester including, in combination, a wheel frame including a longitudinally disposed side frame member at the stubbleward side thereof, a yieldably mounted supplemental frame including a transversely disposed caster wheel supporting bar pivoted intermediate its ends on said frame side member, a bracket pivotally mounted upon the stubbleward end of said bar, a vertically disposed caster wheel supporting yoke journaled in said bracket, and a rod disposed parallel with said bar having its opposite ends pivotally connected with said bracket and said wheel frame whereby said caster wheel supporting yoke is maintained in a vertical position when said supporting bar rocks about its axis.

5. A harvester including, in combination, a wheel frame including a longitudinally disposed side frame member at the stubbleward side thereof, a supplemental frame including a transversely disposed caster wheel supporting bar pivoted intermediate its ends on said side frame member, a bracket pivotally mounted upon the stubbleward end of said bar, a vertically disposed caster wheel supporting yoke journaled in said bracket, a rod disposed parallel with said bar having its opposite ends pivotally connected with said bracket and said wheel frame whereby said caster wheel supporting yoke is maintained in a vertical position when said supporting bar rocks about its axis, and a counterbalancing spring mechanism between the grainward end of said bar and said wheel frame.

6. A harvester including, in combination, a wheel frame including a longitudinally disposed side frame member at the stubbleward side thereof, a supplemental frame including a transversely disposed caster wheel supporting bar pivoted intermediate its ends on said side frame member, a bracket pivotally mounted upon the stubbleward end of said bar, a vertically disposed caster wheel supporting yoke journaled in said bracket, a rod disposed parallel with said bar and having its opposite ends pivotally connected with said bracket and said wheel frame whereby said caster wheel supporting yoke is maintained in a vertical position when said supporting bar rocks about its axis, a diagonally arranged bar having its rear end secured to the stubbleward end of said transverse bar and its opposite end to said wheel frame coincident with the axis of said transverse bar, and a counterbalancing spring mechanism operative between the grainward end of said bar and said wheel frame.

7. A harvester including, in combination, a wheel frame, a spring-pressed supplemental frame connected to one side thereof and capable of movement relative thereto, a caster-wheel carrying yoke journaled vertically in said supplemental frame, and means for maintaining said yoke in a vertical position irrespective of relative movement between said frames.

8. A harvester including, in combination, a wheel frame, a spring-pressed supplemental frame connected to one side thereof and capable of movement relative thereto, a caster-wheel carrying member journaled in a definite direction in said supplemental frame, and means for maintaining the definite direction of said member irrespective of relative movement of said frames.

In testimony whereof I affix my signature, in the presence of two witnesses.

CLINTON A. HAGADONE.

Witnesses:
EDUARD S. CHARLES,
RAY D. LEE.